US012475158B2

United States Patent
Anvaripour et al.

(10) Patent No.: US 12,475,158 B2
(45) Date of Patent: *Nov. 18, 2025

(54) CONTEXT BASED MEDIA CURATION

(71) Applicant: Snap Inc., Santa Monica, CA (US)

(72) Inventors: Kaveh Anvaripour, Santa Monica, CA (US); Ebony James Charlton, Los Angeles, CA (US); Travis Chen, Los Angeles, CA (US); Celia Nicole Mourkogiannis, Los Angeles, CA (US); Kevin Dechau Tang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,680

(22) Filed: Oct. 12, 2021

(65) Prior Publication Data

US 2022/0036079 A1 Feb. 3, 2022

Related U.S. Application Data

(63) Continuation of application No. 16/370,373, filed on Mar. 29, 2019, now Pat. No. 11,170,035.

(51) Int. Cl.
*G06F 16/00* (2019.01)
*G06F 16/2457* (2019.01)
(Continued)

(52) U.S. Cl.
CPC ...... *G06F 16/434* (2019.01); *G06F 16/24578* (2019.01); *G06F 16/41* (2019.01);
(Continued)

(58) Field of Classification Search
CPC ...... G06F 16/434; G06F 16/438; G06F 16/44; G06F 16/24578; G06F 16/41;
(Continued)

(56) References Cited

U.S. PATENT DOCUMENTS 6,804,683 B1 * 10/2004 Matsuzaki .......... G06F 16/5838
7,455,240 B2 * 11/2008 Chapman, Jr. ..... G05D 23/1902
700/83

(Continued)

FOREIGN PATENT DOCUMENTS

CN 108369583 A 8/2018
CN 113892095 A 1/2022
(Continued)

OTHER PUBLICATIONS

Ruoqian Liu et al., "PinterNet: A thematic label curation tool for large image datasets", 2016 IEEE International Conference on Big Data (Big Data), Dec. 2016, pp. 2353-2362.*

(Continued)

*Primary Examiner* — Srirama Channavajjala
(74) *Attorney, Agent, or Firm* — Schwegman Lundberg & Woessner, P.A.

(57) ABSTRACT

A media curation system configured to perform operations that include, capturing an image at a client device, wherein the image includes a depiction of an object, identifying an object category of the object based on the depiction of the object within the image, accessing media content associated with the object category within a media repository, generating a presentation of the media content, and causing display of the presentation of the media content within the image at the client device.

16 Claims, 12 Drawing Sheets

(51) Int. Cl.
| | |
|---|---|
| *G06F 16/41* | (2019.01) |
| *G06F 16/432* | (2019.01) |
| *G06F 16/438* | (2019.01) |
| *G06F 16/44* | (2019.01) |
| *G06F 16/48* | (2019.01) |
| *G06K 7/14* | (2006.01) |
| *G06N 20/00* | (2019.01) |
| *H04L 51/10* | (2022.01) |
| *H04L 51/212* | (2022.01) |
| *G06F 3/0482* | (2013.01) |

(52) U.S. Cl.
CPC .......... *G06F 16/438* (2019.01); *G06F 16/44* (2019.01); *G06F 16/48* (2019.01); *G06K 7/1413* (2013.01); *G06K 7/1417* (2013.01); *G06N 20/00* (2019.01); *H04L 51/10* (2013.01); *H04L 51/212* (2022.05); *G06F 3/0482* (2013.01)

(58) Field of Classification Search
CPC ...... G06F 16/48; G06F 3/0482; G06F 3/0488; G06F 16/90328; G06N 20/00; H04L 51/212; G06K 7/1431; G06K 7/1417
See application file for complete search history.

(56) References Cited

U.S. PATENT DOCUMENTS

| | | | |
|---|---|---|---|
| 8,175,847 B2 | 5/2012 | Zhang et al. | |
| 8,498,490 B1 | 7/2013 | Baluja et al. | |
| 9,142,253 B2* | 9/2015 | Ubillos | G11B 27/034 |
| 9,342,930 B1 | 5/2016 | Kraft et al. | |
| 9,349,095 B1 | 5/2016 | Tseng et al. | |
| 10,733,255 B1* | 8/2020 | Yang | G06N 3/08 |
| 10,795,567 B2* | 10/2020 | Vegesna | G06F 3/0488 |
| 10,820,030 B2* | 10/2020 | Nishimura | H04N 21/43637 |
| 11,024,099 B1* | 6/2021 | Little | G06T 19/20 |
| 11,170,035 B2 | 11/2021 | Anvaripour et al. | |
| 2006/0123360 A1* | 6/2006 | Anwar | G06F 3/0485 |
| | | | 715/810 |
| 2008/0021928 A1 | 1/2008 | Yagnik | |
| 2008/0147664 A1* | 6/2008 | Fujiwara | G06F 3/04892 |
| 2008/0240494 A1* | 10/2008 | Oosawa | G06T 7/0012 |
| | | | 382/100 |
| 2008/0256450 A1* | 10/2008 | Takakura | G06T 11/60 |
| | | | 715/721 |
| 2009/0116752 A1* | 5/2009 | Isomura | G06F 16/58 |
| | | | 382/224 |
| 2009/0172598 A1* | 7/2009 | Yamanaka | G06F 3/0482 |
| | | | 707/999.2 |
| 2010/0011392 A1 | 1/2010 | Bronstein et al. | |
| 2010/0058216 A1* | 3/2010 | Yoon | G06F 3/0482 |
| | | | 715/825 |
| 2011/0029635 A1* | 2/2011 | Shkurko | G06T 11/60 |
| | | | 348/E5.022 |
| 2011/0081948 A1 | 4/2011 | Shirai et al. | |
| 2011/0096093 A1 | 4/2011 | Oi et al. | |
| 2011/0099478 A1 | 4/2011 | Gallagher et al. | |
| 2011/0246182 A1* | 10/2011 | Allen | G06F 40/10 |
| | | | 704/E11.001 |
| 2011/0314031 A1 | 12/2011 | Chittar et al. | |
| 2012/0251011 A1 | 10/2012 | Gao et al. | |
| 2013/0148864 A1* | 6/2013 | Dolson | G06V 20/30 |
| | | | 382/190 |
| 2013/0169853 A1 | 7/2013 | Luong | |
| 2014/0022265 A1 | 1/2014 | Canan et al. | |
| 2014/0320516 A1* | 10/2014 | Son | G06F 3/04817 |
| | | | 345/589 |
| 2014/0365496 A1* | 12/2014 | Chung | G06F 16/285 |
| | | | 707/740 |
| 2015/0169994 A1* | 6/2015 | Chinen | G06F 16/5854 |
| | | | 382/218 |
| 2015/0202962 A1 | 7/2015 | Habashima et al. | |
| 2015/0317365 A1* | 11/2015 | Andress | G06F 16/90324 |
| | | | 715/234 |
| 2015/0317380 A1 | 11/2015 | Rathnavelu et al. | |
| 2016/0034459 A1* | 2/2016 | Larsen | G06F 16/487 |
| | | | 707/740 |
| 2016/0162482 A1 | 6/2016 | Pesavento et al. | |
| 2016/0283595 A1 | 9/2016 | Folkens et al. | |
| 2016/0350421 A1* | 12/2016 | Multerer | G06F 16/93 |
| 2017/0011121 A1* | 1/2017 | Martin | G06F 3/0482 |
| 2017/0083795 A1 | 3/2017 | Ono | |
| 2017/0206431 A1 | 7/2017 | Sun et al. | |
| 2017/0323185 A1 | 11/2017 | Bhardwaj et al. | |
| 2017/0351710 A1 | 12/2017 | Zhu et al. | |
| 2017/0357433 A1* | 12/2017 | Boule | G06F 3/04886 |
| 2018/0097988 A1* | 4/2018 | Tsuchiya | G06V 10/56 |
| 2018/0101894 A1* | 4/2018 | Markoff | G06Q 30/0639 |
| 2018/0129724 A1* | 5/2018 | Heine | G06F 16/2423 |
| 2018/0225290 A1 | 8/2018 | Leppänen et al. | |
| 2018/0336182 A1 | 11/2018 | Lachmi et al. | |
| 2019/0147054 A1 | 5/2019 | Behnken et al. | |
| 2020/0311116 A1 | 10/2020 | Anvaripour et al. | |

FOREIGN PATENT DOCUMENTS

| | | |
|---|---|---|
| KR | 20150034724 A | 4/2015 |
| KR | 20160041085 A | 4/2016 |
| WO | WO-2006062772 A1 | 6/2006 |
| WO | WO-2007103804 A2 | 9/2007 |
| WO | WO-2012142332 A1 | 10/2012 |
| WO | WO2015038515 A1 * | 3/2015 |
| WO | WO-2016070098 A2 | 5/2016 |
| WO | WO2016018785 A1 * | 2/2017 |
| WO | WO2017048359 A1 * | 3/2017 |
| WO | WO2017147305 A1 * | 8/2017 |
| WO | WO 2018104834 A1 * | 6/2018 |
| WO | WO-2018217008 A1 | 11/2018 |
| WO | WO-2020205436 A1 | 10/2020 |

OTHER PUBLICATIONS

Lasse Wollatz et al., "Curation of Image Data for Medical Research", 2018 IEEE 14th International Conference on e-Science (e-Science), Oct.-Nov. 2018, pp. 105-113.*
Feng Zhao et al., "An Intelligent and Interactive Icon Creation System for Mobile Users", 2010 Fifth International Conference on Systems, Apr. 2010, pp. 1-5.*
"U.S. Appl. No. 16/370,373, Final Office Action mailed Apr. 28, 2021", 15 pgs.
"U.S. Appl. No. 16/370,373, Non Final Office Action mailed Mar. 10, 2021", 14 pgs.
"U.S. Appl. No. 16/370,373, Notice of Allowance mailed Jul. 14, 2021", 21 pgs.
"U.S. Appl. No. 16/370,373, Response filed Apr. 19, 2021 to Non Final Office Action mailed Mar. 10, 2021", 10 pgs.
"U.S. Appl. No. 16/370,373, Response filed Jun. 16, 2021 to Final Office Action mailed Apr. 28, 2021", 11 pgs.
"International Application Serial No. PCT/US2020/024994, International Search Report mailed Jul. 6, 2020", 3 pgs.
"International Application Serial No. PCT/US2020/024994, Written Opinion mailed Jul. 6, 2020", 7 pgs.
Sandnes, Frode Eika, et al., "Where was that photo taken? Deriving geographical information from image collections based on temporal exposure attributes", Multimedia Systems, 16, (2010), 309-318.
Wang, Xiaogang, et al., "Query-specific visual semantic spaces for web image re-ranking", IEEE, (Jun. 20-25, 2011), 857-864.
"European Application Serial No. 20720273.0, Communication Pursuant to Article 94(3) EPC mailed Feb. 24, 2023", 7 pgs.
"International Application Serial No. PCT/US2020/024994, International Preliminary Report on Patentability mailed Oct. 14, 2021", 9 pgs.
"European Application Serial No. 20720273.0, Summons to Attend Oral Proceedings mailed Dec. 22, 2023", 12 pgs.
"European Application Serial No. 20720273.0, Response filed Apr. 11, 2024 to Summons to Attend Oral Proceedings mailed Dec. 22, 2023", 12 pgs.

(56) References Cited

OTHER PUBLICATIONS

"Korean Application Serial No. 10-2021-7034749, Notice of Preliminary Rejection mailed Apr. 17, 2024", w/ English translation, 18 pgs.
"Korean Application Serial No. 10-2021-7034749, Response filed Jun. 12, 2024 to Notice of Preliminary Rejection mailed Apr. 17, 2024", w/ English Claims, 31 pgs.
"European Application Serial No. 20720273.0, EPO Written Decision to Refuse mailed Jun. 17, 2024", 23 pgs.
"Chinese Application Serial No. 202080039248.2, Office Action mailed Apr. 25, 2025", w/ English Translation, 12 pgs.

* cited by examiner

400

RECEIVING AN INPUT AT A CLIENT DEVICE, THE INPUT COMPRISING AN INPUT CONTEXT AND AN IMAGE THAT COMPRISES A PLURALITY OF IMAGE FEATURES
402

IDENTIFYING AN OBJECT DEPICTED IN THE IMAGE BASED ON THE PLURALITY OF IMAGE FEATURES
404

ACCESSING A MEDIA REPOSITORY BASED ON AN OBJECT CATEGOR OF THE OBJECT DEPICTED IN THE IMAGE
406

CURATING A COLLECTION OF MEDIA CONTENT BASED ON THE ACCESSING THE MEDIA REPOSITORY
408

CAUSING DISPLAY OF A PRESENTATION OF THE COLLECTION OF MEDIA CONTENT AT A CLIENT DEVICE
410

FIG. 4

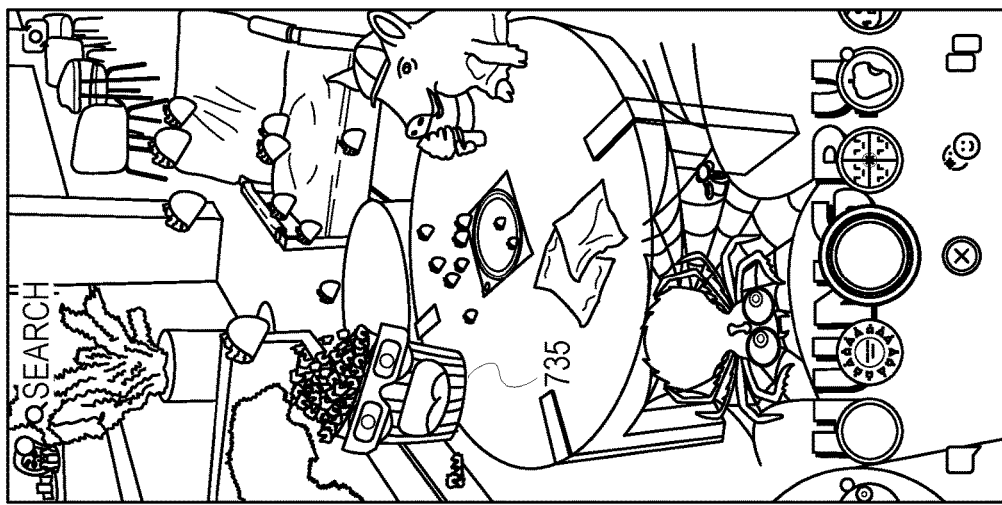
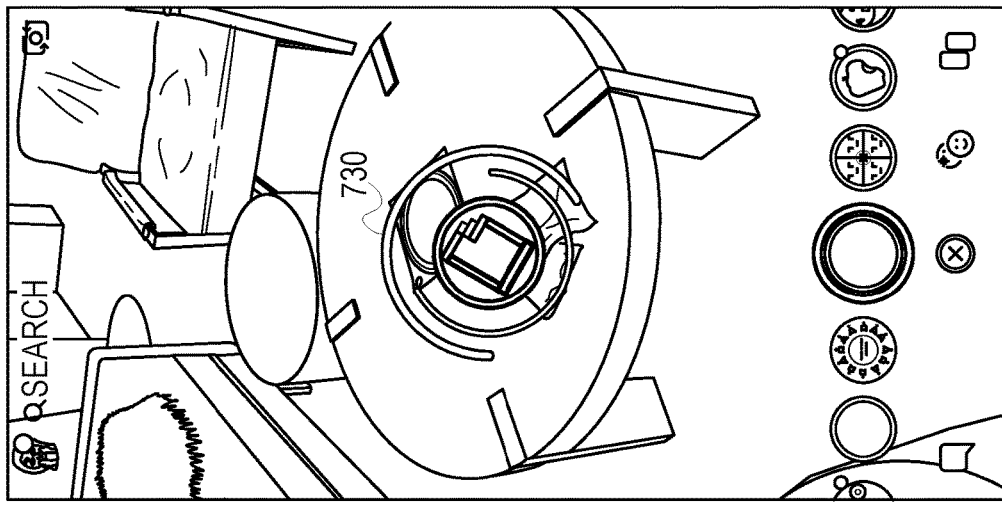
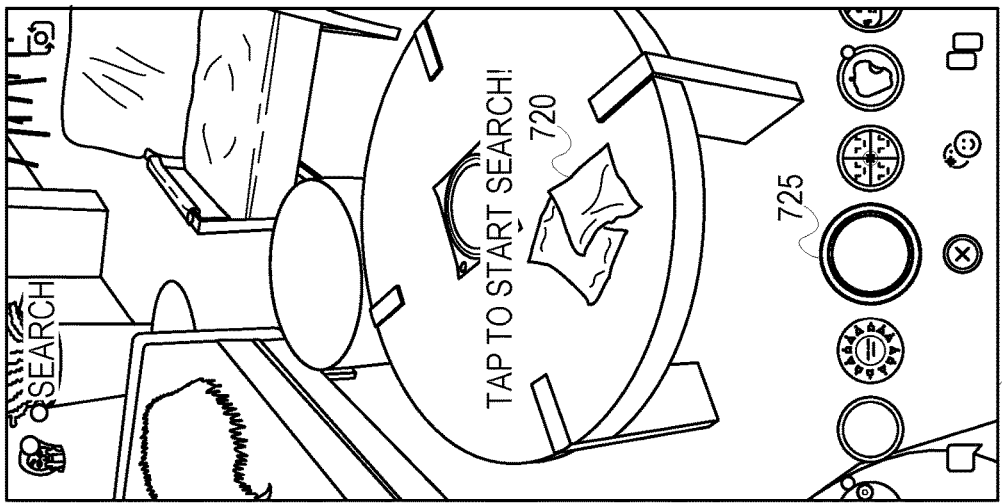
FIG. 7

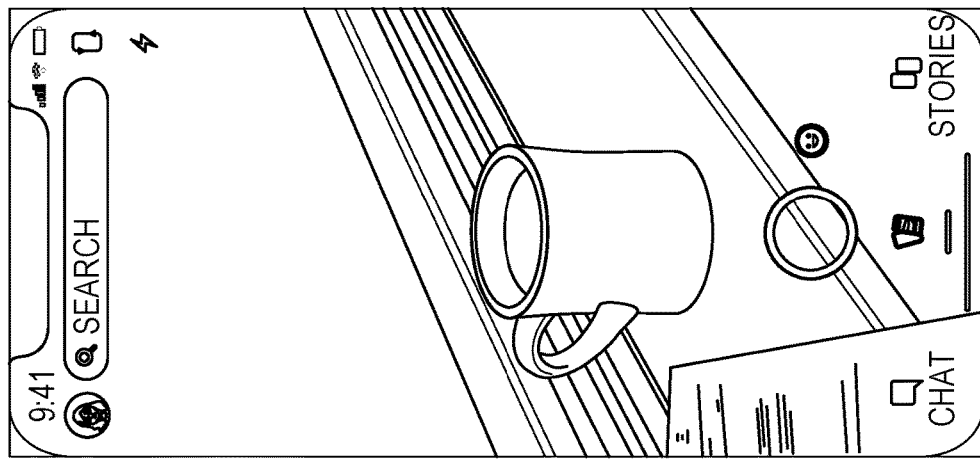
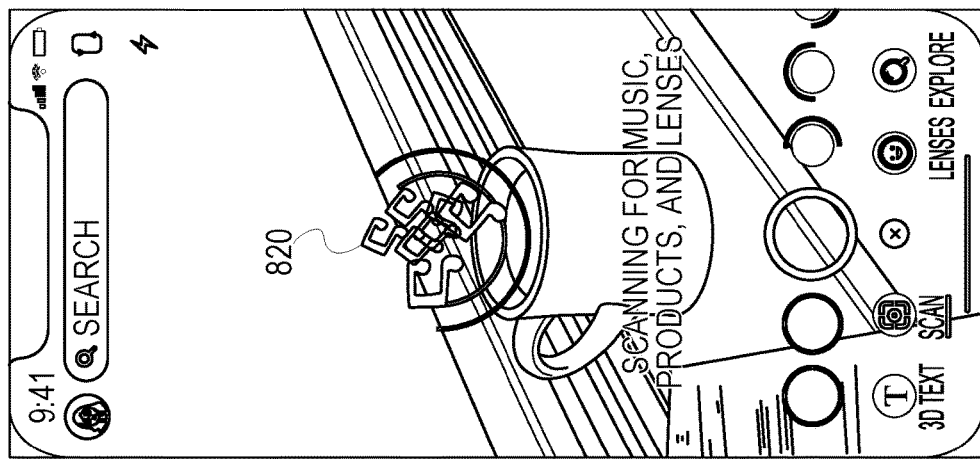
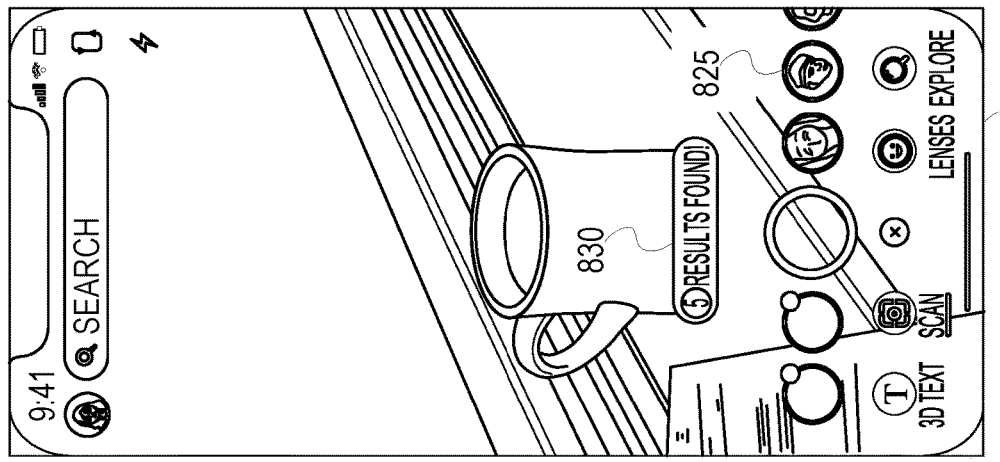
FIG. 8

CONTEXT BASED MEDIA CURATION

PRIORITY CLAIM

This application is a continuation of U.S. patent application Ser. No. 16/370,373, filed on Mar. 29, 2019, which is hereby incorporated by reference in its entirety.

CROSS-REFERENCE TO RELATED APPLICATIONS

This application is related to U.S. patent application Ser. No. 16/232,787, filed on Dec. 26, 2018 and entitled "DYNAMIC CONTEXTUAL MEDIA FILTER," and which is hereby incorporated by reference herein in its entirety.

TECHNICAL FIELD

Embodiments of the present disclosure relate generally to mobile computing technology and, more particularly, but not by way of limitation, to systems for curating and presenting collections of media content based on a user context.

BACKGROUND

Augmented reality (AR), is a live direct or indirect view of a physical, real-world environment whose elements are augmented by computer-generated sensory inputs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of curating a collection of media content based on an input received at a client device, according to certain example embodiments.

FIG. 7 is an interface flow-diagram depicting interfaces presented by a media curation system, according to certain example embodiments.

FIG. 8 is an interface flow-diagram depicting interfaces presented by a media curation system, according to certain example embodiments.

DETAILED DESCRIPTION

Figure 1:
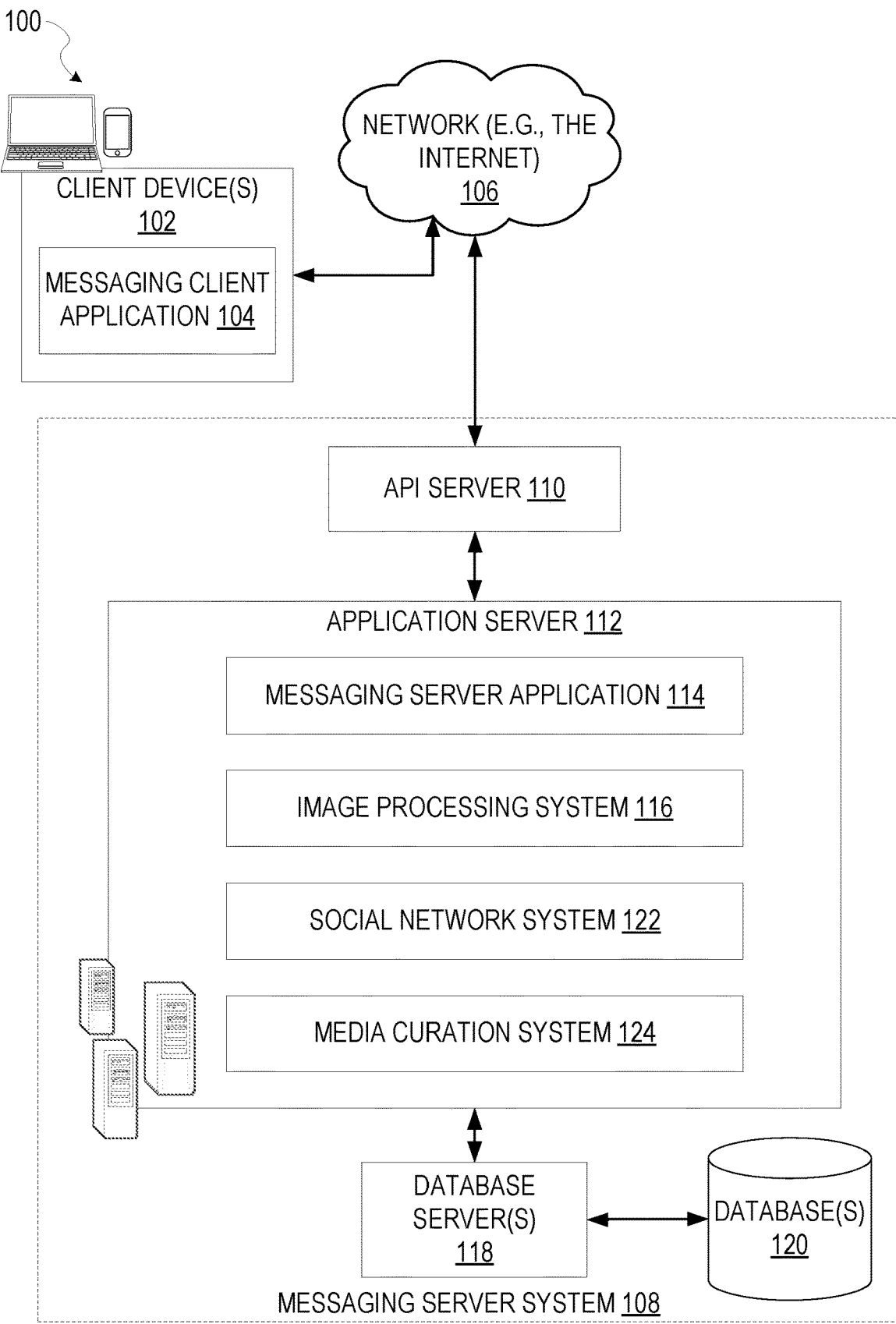
FIG. 1 is a block diagram showing an example messaging system for exchanging data (e.g., messages and associated content) over a network in accordance with some embodiments, wherein the messaging system includes a media curation system.

As discussed above, AR systems provide users within graphical user interfaces (GUI) to display a live direct or indirect view of a physical, real-world environment, wherein elements of the view are augmented by computer-generated sensory inputs. For example, an AR interface may present media content at positions within a display of a view of a real-world environment, such that the media content appears to interact with elements in the real-world environment. Similarly, a media overlay, or "lens" comprises a set of media items which may be presented as an overlay, or filter, upon media content presented at a client device, which then modifies or transforms the media content in some way. For example, complex additions or transformations to the media content presented at a client device may be performed using AR content of a lens, such as adding rabbit ears to the head of a person in a video or image, adding floating hearts and stars to a video or image, altering the proportions of a person or objects features within a video or image, or many other such transformations. The transformations include real-time transformations which modify an image or video as it is captured by a client device and displayed on a screen, as well as modifications to stored content, such as video clips in a gallery or repository accessible by the client device.

Example embodiments described herein relate to a context based media curation system to determine a user context based on one or more inputs received at a client device, and to curate a collection of media content based on the user context, wherein the collection of media content may include auditory content, video content, images, as well as AR content, including lenses. According to certain embodiments, the media curation system is configured to perform operations that include, receiving an input at a client device, wherein the input includes an input context and an image that comprises a plurality of image features, identifying a category based on the plurality of image features of the image, generating a query based on the category and the input context, querying a media repository based on the query, wherein the media repository comprises a set of media items, and curating a collection of media content based on the set of media items in the media repository. The media curation system causes display of a presentation of the collection of media content at the client device, wherein the presentation of the collection of media content may be navigable by a user of the client device.

The media content may include animated Graphics Interchange Format (GIF) images of various shapes, sizes and themes, as well as audio content (such as songs or sound effects), and media lenses, wherein media lenses include AR content presented as a media filter that augments image data displayed at a client device. In some embodiments, the media curation system may be in communication with a media repository that comprises a sorted and labeled collection of the media content, wherein the media content within the collection of media content is labeled or tagged based on attributes of the media content or based on associations to labels or tags made by users. For example, the media content may be tagged with a label that identifies an object category of the media content, such as "food," "basketball," "morning," "April," such that a reference to the object category corresponds with a set of media content from among the collection of media content.

In some embodiments, the input includes an image, or image of a video, that comprises a depiction of one or more objects in a real-world environment, and metadata that identifies one or more contextual inputs associated with the input, such as location data and temporal data. Responsive to receiving the input that include the image, the media curation system identifies an object category of one or more of the object depicted within the image. For example, the media curation system may detect one or more Quick Response (QR) codes within the image, wherein the QR codes identify an object or object category associated with the object depicted within the image, or in further embodiments may also employ one or more image and text recognition techniques to identify the object depicted in the image. For example, the media curation system may employ a machine learned model, or neural network, trained to identify object categories based on labeled training data that comprises a plurality of image features.

Based on the identification of the object or object category, the media curation system retrieves a set of labels or tags associated with the object or object category, and generates a query based on the set of labels or tags, and the input context of the input. The media curation system queries a media repository based on the query to identify a collection of media content.

In response to curating the collection of media content from the media repository, the media curation system causes display of a presentation of the collection of media content at the client device. In some embodiments, the presentation of the collection of media content includes a vertical or horizontal arrangement of the media content from among the collection of media content, such that a user of the client device may navigate through the collection of media content.

In some embodiments, the media curation system generates custom media content to be presented among the presentation of the collection of media content, based on the query and the input context. Responsive to receiving the input that includes the image, the media curation system selects a media template based on the plurality of image features of the image, wherein the media template defines a display configuration for a set of media items from among the collection of media content within the image. The media template may define positions to present a portion of the set of media content within the image at the client device. In some embodiments, the presentation of the set of media content within the image at the client device may be based on a position (or positions) of the plurality of image features. For example, in the context of a lens, AR content of a lens may be presented by detecting objects (e.g., faces, hands, bodies, cats, dogs, surfaces, objects, etc.), tracking such objects as they leave, enter, and move around the field of view in an image or video frame, and applying modifications based on the AR content of the lens to the objects as they are tracked.

In some embodiments, responsive to receiving a selection of a lens, elements to be transformed by the lens are identified, and then detected and tracked. Image features corresponding to the objects are modified according to the AR content of the selected lens, thus transforming the frames of the video stream. Transformation of frames of a video stream can be performed by different methods for different kinds of transformation.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a media curation system 124. The media curation system 124 is configured to receive an input that includes an input context and an image that comprises a plurality of image features, identify one or more objects depicted in the image based on the plurality of image features, select one or more categories based on the one or more objects, wherein the one or more categories each correspond with a set of tags, generate a query based on the set of tags, query a media repository based on the query, and curate a collection of media content that comprises a set of media items from the media repository, according to certain example embodiments. Further details of the media curation system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
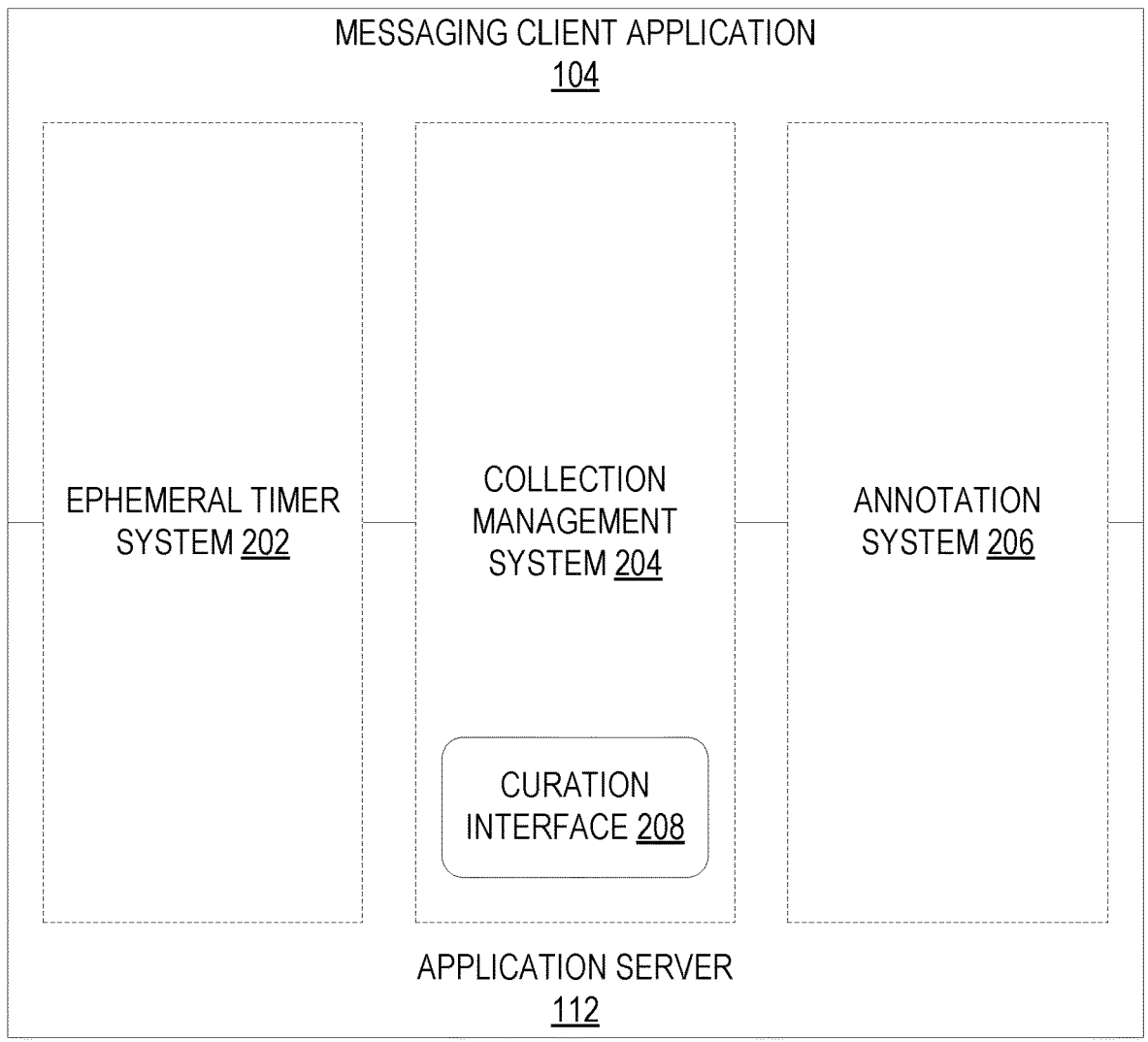
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter, lens) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the media curation system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
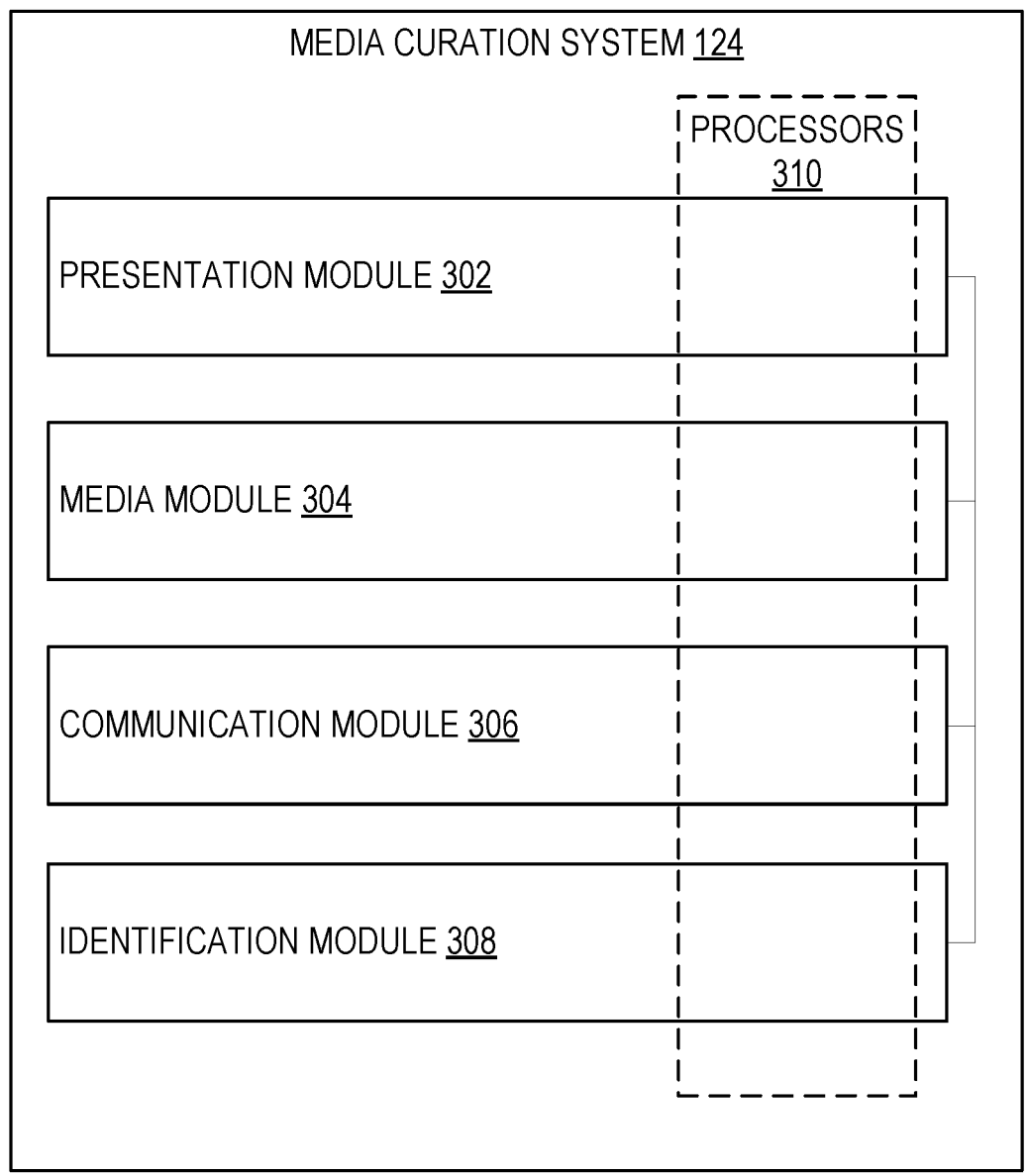
FIG. 3 is a block diagram illustrating various modules of a media curation system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the media curation system 124 that configure the media curation system 124 to perform operations to receive an input that includes an input context and an image that comprises a plurality of image features, identify one or more objects depicted in the image based on the plurality of image features, select one or more categories based on the one or more objects, wherein the one or more categories each correspond with a set of tags, generate a query based on the set of tags, query a media repository based on the query, and curate a collection of media content that comprises a set of media items from the media repository, according to certain example embodiments.

In further embodiments, the components of the media curation system 124 may configure the media curation system 124 to perform operations to capture an image that includes a depiction of an object from a client device 102, identify one or more objects or object categories within the image based on the depiction of the object, select one or more labels or tags based on the object or object categories, retrieve a set of media content based on the labels or tags, and cause display of a presentation of the set of media content within the image at the client device, according to some example embodiments.

The media curation system 124 is shown as including a presentation module 302, a media module 304, a communication module 306, and an identification module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the media curation system 124 may physically include an arrangement of one or more of the processors 310 (e.g., a subset of or among the one or more processors of the machine) configured to perform the operations described herein for that module. As another example, any module of the media curation system 124 may include software, hardware, or both, that configure an arrangement of one or more processors 310 (e.g., among the one or more processors of the machine) to perform the operations described herein for that module. Accordingly, different modules of the media curation system 124 may include and configure different arrangements of such processors 310 or a single arrangement of such processors 310 at different points in time. Moreover, any two or more modules of the media curation system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart depicting a method 400 of curating a collection of media content based on an input received at a client device, according to certain example embodiments. Operations of the method 400 may be performed by the modules described above with respect to FIG. 3. As shown in FIG. 4, the method 400 includes one or more operations 402, 404, 406, 408, and 410.

At operation 402, the presentation module 302 receives an input at the client device 102, wherein the input comprises an input context and image data that includes a plurality of image features. For example, the input context may include metadata that includes location data identifying a location of the client device 102, as well as temporal data indicating a time or date.

In some embodiments, the context data may also include user profile information of a user profile associated with the client device 102. For example, the user profile data may include identifications of one or more user affinities (i.e., "likes") associated with the user, as well as an identification of one or more network connections (i.e., buddies) of the user.

In some embodiments, receiving an input at the client device 102 may include operations to capture an image at the client device 102, wherein the image includes a depiction of an object at a position within the image. For example, the presentation module 302 may activate a camera of the client device 102 and cause the camera of the client device 102 to capture the image.

At operation 404, the identification module 308 identifies one or more objects depicted within the image based on the plurality of image features of the image data. In some embodiments, to identify the one or more objects, the identification module 308 may utilize computer vision to perform one or more image or pattern recognition techniques. In further embodiments, the identification module 308 may identify one or more QR codes within the image, and identify the object based on the QR codes.

Based on the one or more objects identified in the image, the identification module 308 determines one or more object categories that correspond with the one or more objects, wherein the one or more object categories are associated with a set of tags.

At operation 406, the media module 304 accesses a media repository, such as the database 120, to identify a set of media content based on at least the one or more object categories, and the input context. In some embodiments, responsive to identifying the one or more objects depicted within the image based on the plurality of image features of the image data, the media module 304 generates a query based on tags associated with each of the one or more objects. For example, the media module 304 may identify a first object and a second object, wherein the first object corresponds with a first media tag (or first set of media tags), and the second object corresponds with a second media tag (or second set of media tags). The media module 304 may generate a query by combining the first media tag, the second media tag, and the input context, and querying the media repository (i.e., the database 120) based on the query.

At operation 408, the media module 304 curates a collection of media content based on media content accessed within the media repository, based on the tags associated with the categories that correspond with the one or more objects identified by the identification module 308, and the input context of the client device 102. For example, in some embodiments the media module 304 accesses media content associated with the one or more objects within a media repository (e.g., the databases 120). The identification module 308 may select one or more tags or labels based on the identification of the object within the image and cause the media module 304 to query the media repository based on the selected tags or labels. The media module 304 may therefore access a set of media content relevant to the object identified within the image, by referencing media content labeled within the media repository with the selected tags or labels.

At operation 408, the presentation module 302 causes display of a presentation of collection of media content at a client device 102. In some embodiments, the presentation of the collection of media content comprises a navigable list of media items displayed at the client device 102. For example, the presentation of the collection of media content may be presented horizontally or vertically at the client device 102, such as the collection of media content 825 of FIG. 8.

In some embodiments, generating the presentation of the collection of media content may include ranking the collection of media content based on the corresponding tags, the query, and the input context.

In some embodiments, the presentation of media content may include an AR display of one or more media items at positions in the image based on the plurality of features of the image data. For example, as seen in FIG. 7, the presentation of media content may include the presentation of media content 735, as depicted in the interface 715, wherein the presentation of the set of media content 735 comprises a plurality of media items that include images and GIFs relevant to the objects detected based on the plurality of image features of the image data.

In some embodiments, to generate the presentation of the media content, such as the presentation of the set of media content 735, the presentation module 302 retrieves a media template, wherein the media template defines a presentation format and layout to be applied to the set of media content. For example, the media template may define positions and orientations to present the media content within the image, at the client device 102. The media template may for example be based on one or more image attributes including the plurality of image features, as well as the input context.

In some embodiments, to generate the presentation of the media content to be displayed at the client device 102, the media module 304 provides the client device 102 with identifiers of each media content among the set of media content, such that the client device 102 may identify the relevant media content within a local memory repository, such as the database 120.

Figure 5:
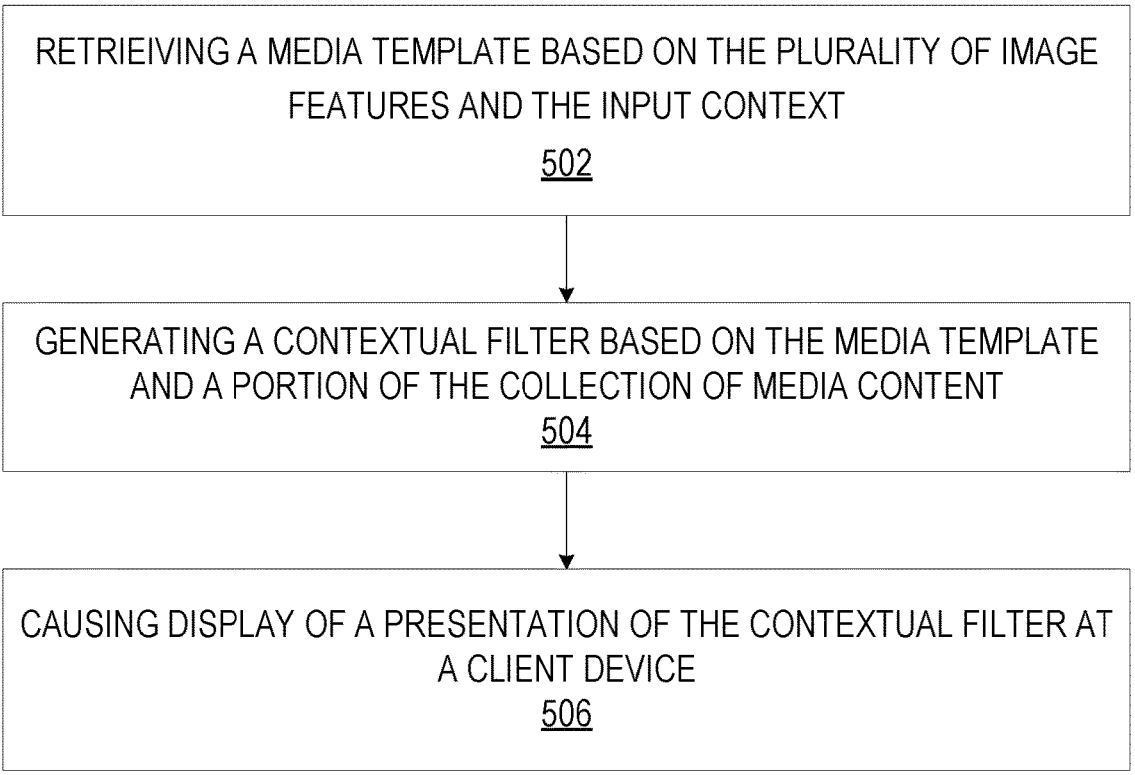
FIG. 5 is a flowchart depicting a method of generating a custom contextual filter, according to certain example embodiments.

FIG. 5 is a flowchart depicting a method 500 of generating a custom contextual filter, according to certain example embodiments. Operations of the method 500 may be performed by the modules described above with respect to FIG. 3. As shown in FIG. 5, the method 500 includes one or more operations 502, 504, and 506.

In some embodiments, the contextual filter may include a media overlay, or "lens," wherein the media overlay comprises AR content to be presented upon images and videos at a client device 102. As an illustrative example, a user of the media curation system 124 may activate a camera of the client device 102 and cause display of an image depicting a real-world environment. The image may include pictures as well as videos (real-time or prerecorded). Responsive to causing display of the image, the media curation system 124 may generate a custom contextual filter (i.e., media overlay, lens) based on one or more objects detected within the image, and an input context of the client device 102.

At operation 502, the media module 304 retrieves a media template based on the input received at the client device, wherein the input includes an image that comprises a set of image features, and an input context. For example, responsive to receiving the input, the media module 304 accesses a template repository to retrieve a media template based on at least a portion of the plurality of image features, and the input context.

At operation 504, the media module 304 generates a contextual filter (i.e., a lens) based on the media template and at least a portion of the collection of media content curated based on the plurality of image features and the input context. For example, in some embodiments the media module 304 may select the portion of the media content from the collection of media content based on the plurality of image features, the input context, and the media template. The media module 304 populates the template with the portion of the media content from the collection of media content. For example, the media template may define display instructions for media items within the template based on attributes of the media items themselves.

At operation 506, the presentation module 302 causes display of a presentation of the contextual filter at the client device 102, as seen in interface 715 of FIG. 7. In some embodiments, the presentation module 302 may present the contextual filter among the presentation of the collection of media content, such that a user may provide an input to select the contextual filter. For example, as seen in FIG. 8, a graphical icon representative of the contextual filter may be presented among the collection of media content 825.

Figure 6:
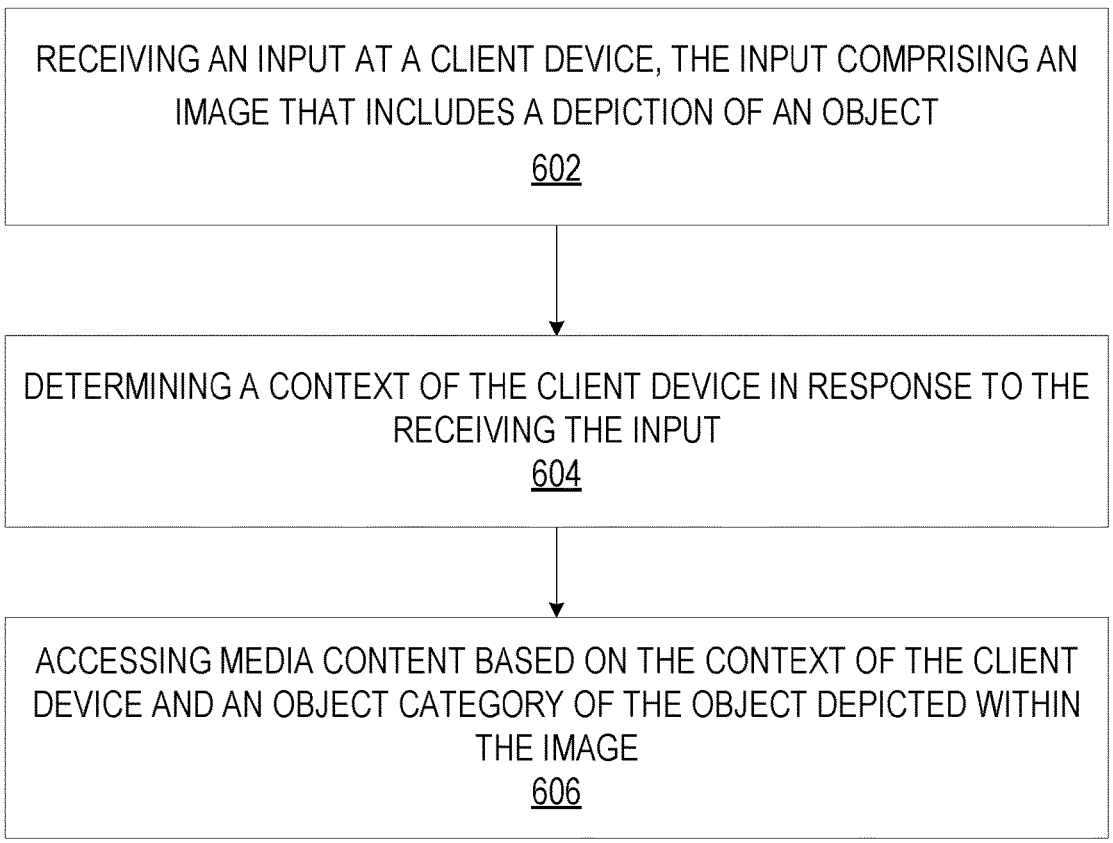
FIG. 6 is a flowchart depicting a method of generating a custom contextual filter, according to certain example embodiments.

FIG. 6 is a flowchart depicting a method 500 of generating a contextual filter to be displayed at a client device 102, according to certain example embodiments. Operations of the method 600 may be performed by the modules described above with respect to FIG. 3. As shown in FIG. 6, the method 600 includes one or more operations 602, 604, and 606.

At operation 602, as in operation 402, the presentation module 302 receives an input that comprises an image that includes a depiction of an object. For example, the image may comprise a plurality of image features that correspond with one or more objects depicted at positions in the image. For example, the presentation module 302 may activate a camera of the client device 102 and cause the camera of the client device 102 to capture the image. In some embodiments, the image captured by the presentation module 302 may include image metadata that includes location data, temporal data, as well as device data of the client device 102.

At operation 604, the identification module 308 determines a context of the client device 102 in response to the receiving the input. For example, the context may include a location of the client device, a time of day in which the image was captured, as well as a device type of the client device 102.

In some embodiments, the identification module 308 may parse the metadata of the image in order to determine the relevant context information from the location data, temporal data, and device data of the metadata.

At operation 608, the media module 304 accesses media content within a media repository based on the context of the client device 102 and the one or more objects depicted in the image from the client device 102. For example, the media content may correspond with one or more tags based on an object category, as well as with location information or temporal information within the media repository, such that reference to a particular time of day, season, day of week, month, or place, may identify a set of relevant media content.

FIG. 7 is an interface flow-diagram 700 depicting interfaces presented by a media curation system 124, according to certain example embodiments. Operations depicted by the interfaces of the flow-diagram 700 may be performed by the modules described above with respect to FIG. 3.

Interface 705 depicts an image captured by a client device 102. As seen in FIG. 7, the interface 705 includes a depiction of an object 720 at a position within the interface 705.

In some embodiments, the client device 102 may activate the media curation system 124 and cause the media curation system 124 to capture the image depicted within the interface 705 in response to receiving a user input selecting the user option 725, as displayed within the interface 705.

Responsive to receiving the input selecting the user option 725, the media curation system 124 may cause display of a graphical icon 730 within the interface 710, to indicate that the media curation system 124 has been activated.

Interface 715 comprises a presentation of a media overlay (i.e., a lens) that comprises a set of media content 735 from among a collection of media content curated based on one or more objects, such as the object 720, depicted in the interface 705, and displayed within the image captured by the client device 102. As seen in the interface 715, the set of media content 735 of the media overlay may be displayed at positions within the image based on a position of the object 720, as defined by a media template. As seen in the interface 715, the presentation of the set of media content 735 may comprise a plurality of media items that include images and GIFs relevant to the object 720.

For example, as seen in FIG. 7, the object 720 is a bag of chips. The media curation system 124 identifies an object category of the object 720 (e.g., food, snacks, etc.), and retrieves the set of media content 735, wherein the set of media content 735 includes media content tagged or labeled with the object category of the object 720.

The positions of each media content among the set of media content 735 within the image depicted in the interface 705 may be determined based on a media template, as discussed in the methods 400, 500, and 600. A user of a client device 102 may thereby generate a message that includes the set of media content 735 to be distributed to one or more recipients identified by the user of the client device 102. In some embodiments, the message may include an ephemeral message.

FIG. 8 is an interface flow-diagram 800 depicting interfaces presented by a media curation system 124, according to certain example embodiments. Operations depicted by the interfaces of the flow-diagram 800 may be performed by the modules described above with respect to FIG. 3.

Interface 805 depicts an input received at a client device 102. According to certain embodiments, the input may include image or video data which can be streamed from a camera associated with the client device 102. For example, a user of the client device 102 may activate a camera of the client device 102, causing the client device 102 to display the image data.

In response to receiving the input at the client device 102, as seen in the interface 810, the media curation system 124 presents the indicator 820 responsive to detecting a set of features that correspond with one or more objects depicted within an image. In some embodiments, the indicator 820 may vary based on the object categories or types. For example, as seen in the interface 810, the indicator 820 comprises a display of a set of musical notes, indicating that one or more objects corresponding to auditory content may be detected within the image presented in the interfaces 805 and 810.

Responsive to curating a collection of media content, as in operation 408 of the method 400 depicted in FIG. 4, the media curation system 124 causes display of presentation of the collection of media content 825 at a position within the image displayed within the interfaces 805, 810, and 815. In some embodiments, the presentation of the collection of media content 825 may also include a display of the results indicator 830, that comprises an indication of a number of media items in the collection of media content 825.

Figure 9:
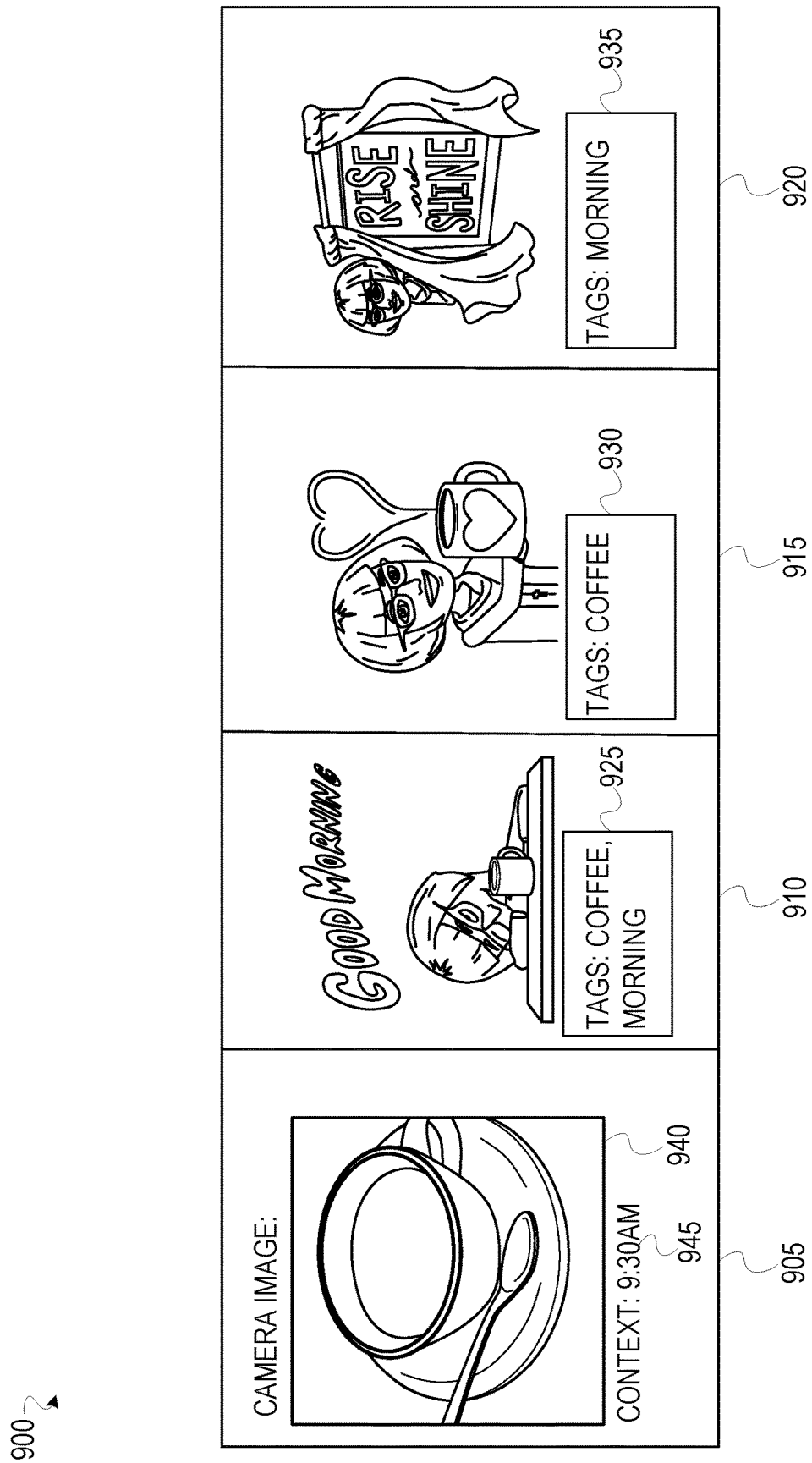
FIG. 9 is an illustration depicting a collection of media content curated based on an input, according to certain example embodiments.

FIG. 9 is an illustration 900 depicting a collection of media content curated based on an input 905, according to certain example embodiments. As seen in FIG. 9, the collection of media content may include media content 910, 915, and 920, wherein the media content each correspond with tags 925, 930, and 935.

As described in operation 402 of the method 400 depicted in FIG. 4, and operation 602 of the method 600 depicted in FIG. 6, the input 905 may comprise an image 940 (or frame of a video), and context input 945, wherein the context input 945 may include one or more of user profile data, temporal data, location data, and device data.

Responsive to receiving the input 905, the media curation system 124 curates a collection of media content based on a plurality of image features of the image 940 and the input content 945. For example, as seen in the illustration 900, the image 940 comprises a depiction of an object (a cup of coffee), and the input context includes temporal data (i.e., 9:30 AM in the morning).

The media curation system 124 generates a query based on one or more tags associated with an object category of the object, and the input context 945 of the input 905. As seen in the illustration 900, the tags may include tags 925, 930, and 935. As described in operation 1008 of the method 1000 depicted in FIG. 10, the media curation system 124 generates a query that comprises a set of query terms, wherein the query terms are based on one or more tags associated with an object category of an object depicted within an input (i.e., an image), and an input context of the input (i.e., time of day, location, device type, user profile information).

In some embodiments, the media content 910, 915, and 920 may be associated with the corresponding tag 925, 930, and 935 within a media repository, such as the database 120. In some embodiments, a user of the media curation system 124 may create and assign tags to the media content within the media repository.

Figure 10:
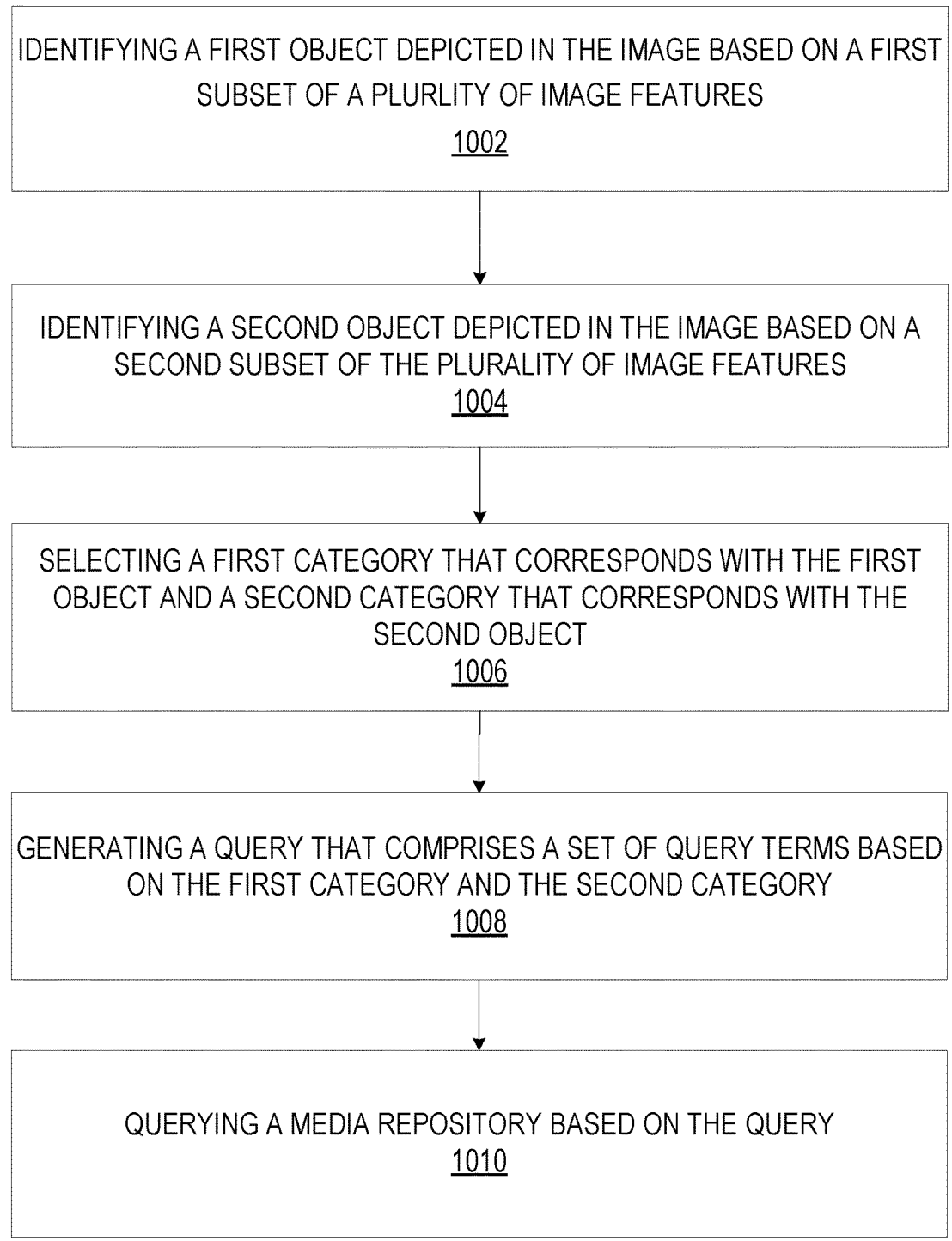
FIG. 10 is a flowchart depicting a method of curating a collection of media content based on an input that comprises an image and an input context, according to certain example embodiments.

FIG. 10 is a flowchart depicting a method 1000 of curating a collection of media content based on an input that comprises an image and an input context, according to certain example embodiments. Operations of the method

1000 may be performed by the modules described above with respect to FIG. 3. As shown in FIG. 10, the method 1000 includes one or more operations 1002, 1004, 1006, 1008, and 1010.

At operations 1002 and 1004, the identification module 308 identifies a first object and a second object depicted in an image based on a first subset of the plurality of image features and a second subject of the plurality of image features of the image. For example, responsive to receiving an input that includes an image and an input context, the identification module 308 analyzes a plurality of image features of the image to identify one or more objects depicted within the image.

Responsive to detecting the first object and the second object based on the plurality of image features, the media module 304 selects a first category that corresponds with the first object and a second category that corresponds with the second object. The first category and second category may each comprise corresponding sets of tags (i.e., labels).

At operation 1008, the media module 304 generates a query that comprises a set of query terms based on the first category and the second category. For example, the query may comprise the set of tags associated with the first category and the second category, as well as one or more tags associated with the input context. Based on the query, at operation 1010 the media module 304 queries a media repository (e.g., the database 120) to identify a collection of media content.

In some embodiments, the media items in the collection of media content may include images, videos, audio content, as well as lenses and media overlays, wherein the lenses and media overlays comprise content that includes AR content to be presented at the client device 102.

Software Architecture

Figure 11:
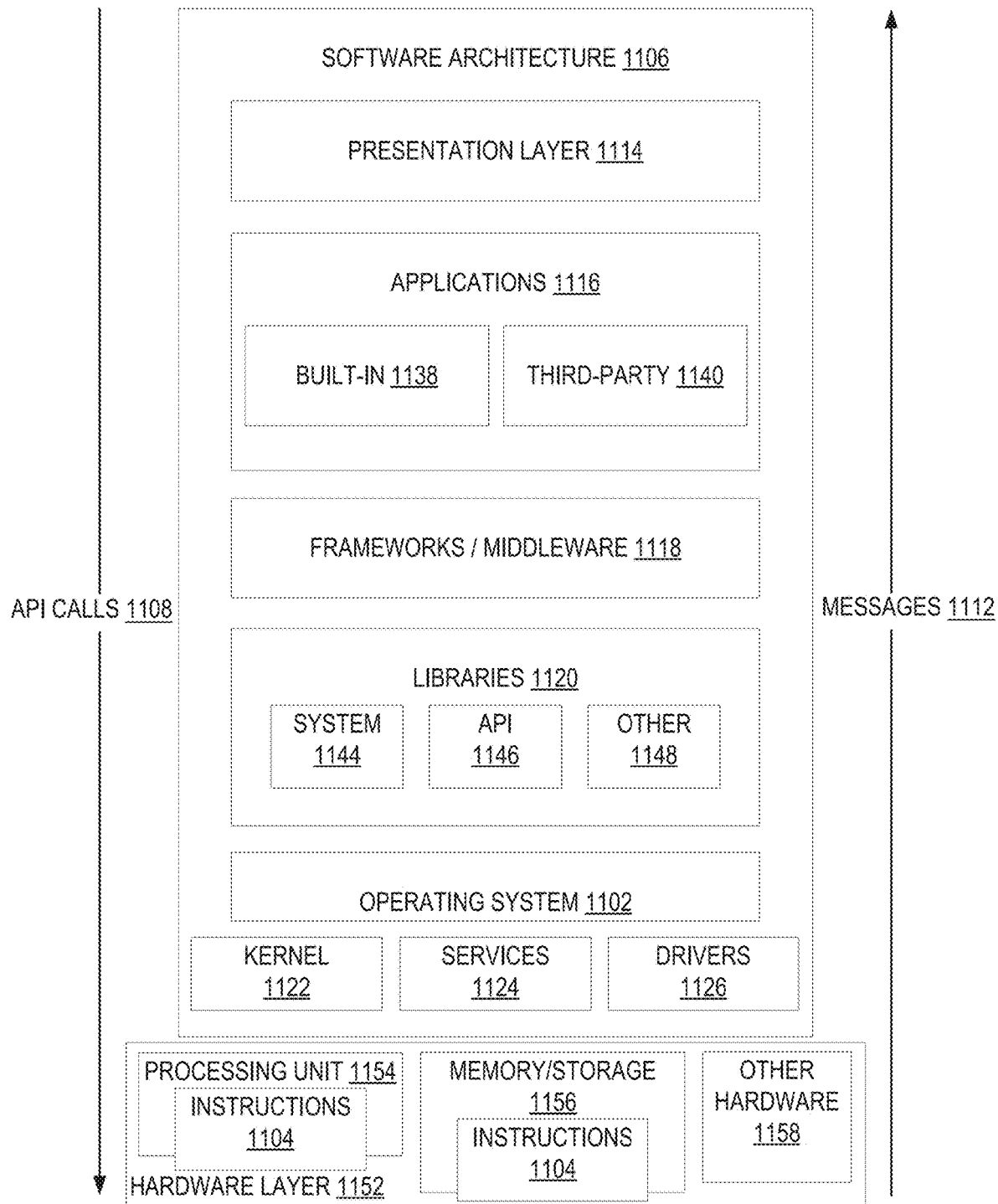
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1200 of FIG. 12 that includes, among other things, processors 1204, memory 1214, and I/O components 1218. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
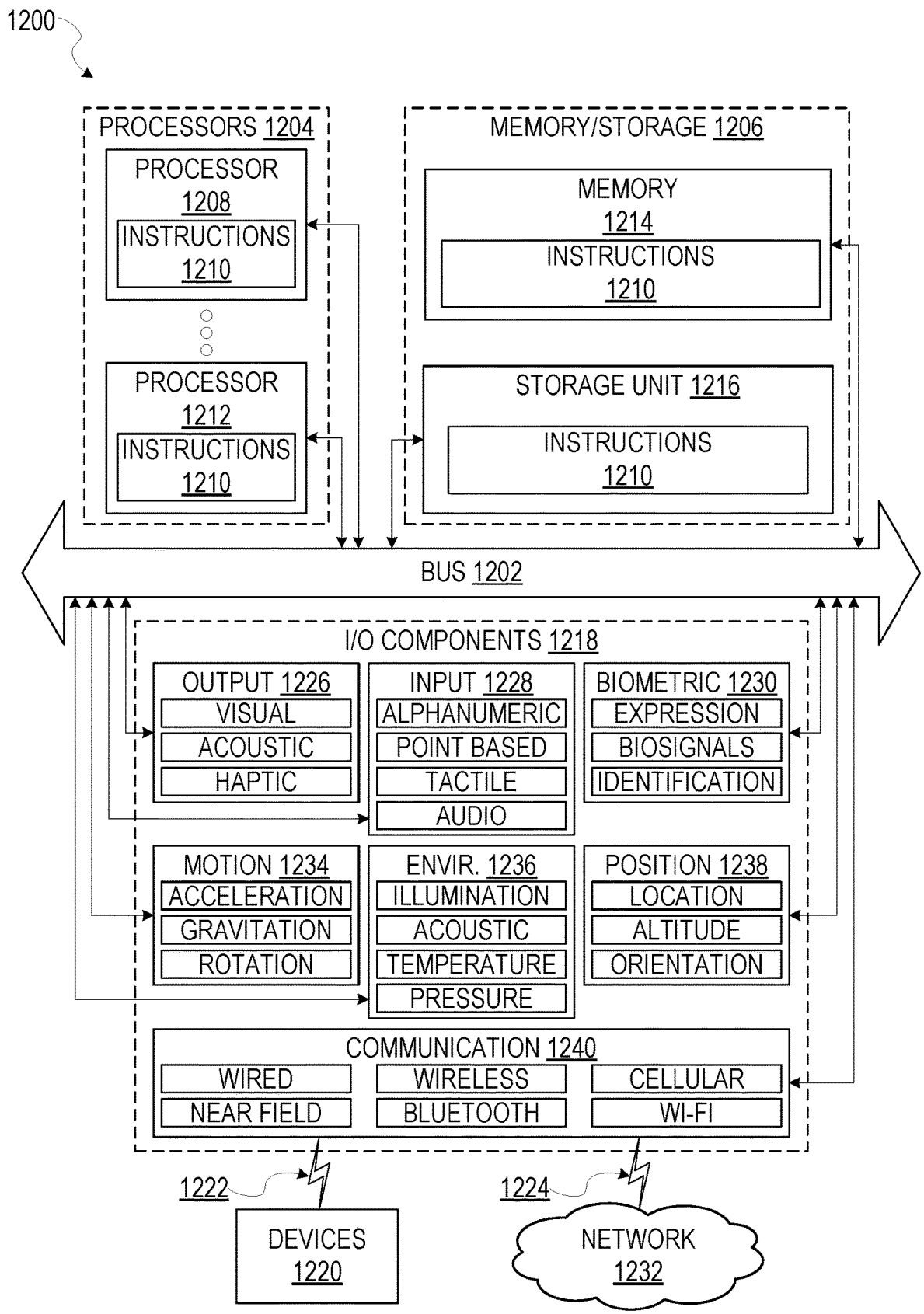
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMES TAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   causing display of an image that comprises a plurality of image features within a graphical user interface (GUI) at a client device, the GUI including a menu element that includes a graphical icon;
   receiving, at the client device, an input that selects the graphical icon from within the menu element;
   accessing user profile data associated with a user of the client device, the user profile data including user affinities;
   determining an input context of the client device based on the user profile data responsive to the input that selects the graphical icon;
   identifying a first object and a second object depicted by the image based on the plurality of image features of the image responsive to the input that selects the graphical icon from within the menu element, the first object corresponding with a first media tag, and the second object corresponding with a second media tag;
   causing display of an indicator corresponding with one or more of the first object, the second object, or the input context;
   generating a query to a media repository based on at least the input context that includes the user affinities from the user profile data, the first media tag and the second media tag;
   accessing a set of media items from within the media repository based on the query, the set of media items comprising tags that correspond with object categories and input contexts;
   determining a ranking the set of media items based on the tags, the query, and the input context; and
   causing display of a presentation of the set of media items from the media repository at the client device based on the ranking, the presentation of the set of media items comprising a navigable arrangement of a set of icons displayed horizontally within the GUI of the client device.

2. The method of claim 1, wherein the causing display of the presentation of the set of media items further comprises:
   causing display of a notification in response to the accessing the set of media items from within the repository;
   receiving a selection of the notification; and
   causing display of the presentation of the set of media items in response to the selection of the notification.

3. The method of claim 2, wherein the notification comprises a display of an indication of a number of media items among the set of media items.

4. The method of claim 1, wherein the identifying the object depicted by the image based on the plurality of image features further comprises:
   detecting the plurality of image features; and
   presenting an indicator at a position within the image in response to the detecting the plurality of image features.

5. The method of claim 4, wherein the indicator comprises a graphical property based on the category of the object.

6. The method of claim 1, wherein the media overlay comprises AR content to be presented at the client device.

7. The method of claim 1, wherein the determining an input context of the client device includes accessing a user profile data, the user profile data comprising one or more of a user device type, a user affinity, or a network connection of the client device.

8. A system comprising:
   a memory; and
   at least one hardware processor coupled to the memory and comprising instructions that causes the system to perform operations comprising:
   causing display of an image that comprises a plurality of image features within a graphical user interface (GUI) at a client device, the GUI including a menu element that includes a graphical icon;
   receiving, at the client device, an input that selects the graphical icon from within the menu element;
   accessing user profile data associated with a user of the client device, the user profile data including user affinities;
   determining an input context of the client device based on the user profile data responsive to the input that selects the graphical icon;
   identifying a first object and a second object depicted by the image based on the plurality of image features of the image responsive to the input that selects the graphical icon from within the menu element, the first object corresponding with a first media tag, and the second object corresponding with a second media tag;
   causing display of an indicator corresponding with one or more of the first object, the second object, or the input context;
   generating a query to a media repository based on at least the input context that includes the user affinities from the user profile data, the first media tag and the second media tag;
   accessing a set of media items from within the media repository based on the query, the set of media items comprising tags that correspond with object categories and input contexts;
   determining a ranking the set of media items based on the tags, the query, and the input context; and
   causing display of a presentation of the set of media items from the media repository at the client device based on the ranking, the presentation of the set of media items comprising a navigable arrangement of a set of icons displayed horizontally within the GUI of the client device.

9. The system of claim 8, wherein the causing display of the presentation of the set of media items further comprises:
   causing display of a notification in response to the accessing the set of media items from within the repository;
   receiving a selection of the notification; and
   causing display of the presentation of the set of media items in response to the selection of the notification.

10. The system of claim 9, wherein the notification comprises a display of an indication of a number of media items among the set of media items.

11. The system of claim 8, wherein the identifying the object depicted by the image based on the plurality of image features further comprises:
  detecting the plurality of image features; and
  presenting an indicator at a position within the image in response to the detecting the plurality of image features.

12. The system of claim 11, wherein the indicator comprises a graphical property based on the category of the object.

13. A non-transitory machine-readable storage medium comprising instructions that, when executed by one or more processors of a machine, cause the machine to perform operations comprising:
  causing display of an image that comprises a plurality of image features within a graphical user interface (GUI) at a client device, the GUI including a menu element that includes a graphical icon;
  receiving, at the client device, an input that selects the graphical icon from within the menu element;
  accessing user profile data associated with a user of the client device, the user profile data including user affinities;
  determining an input context of the client device based on the user profile data responsive to the input that selects the graphical icon;
  identifying a first object and a second object depicted by the image based on the plurality of image features of the image responsive to the input that selects the graphical icon from within the menu element, the first object corresponding with a first media tag, and the second object corresponding with a second media tag;
  causing display of an indicator corresponding with one or more of the first object, the second object, or the input context;
  generating a query to a media repository based on at least the input context that includes the user affinities from the user profile data, the first media tag and the second media tag;
  accessing a set of media items from within the media repository based on the query, the set of media items comprising tags that correspond with object categories and input contexts;
  determining a ranking the set of media items based on the tags, the query, and the input context; and
  causing display of a presentation of the set of media items from the media repository at the client device based on the ranking, the presentation of the set of media items comprising a navigable arrangement of a set of icons displayed horizontally within the GUI of the client device.

14. The non-transitory machine-readable storage medium of claim 13, wherein the causing display of the presentation of the set of media items further comprises:
  causing display of a notification in response to the accessing the set of media items from within the repository;
  receiving a selection of the notification; and
  causing display of the presentation of the set of media items in response to the selection of the notification.

15. The non-transitory machine-readable storage medium of claim 14, wherein the notification comprises a display of an indication of a number of media items among the set of media items.

16. The non-transitory machine-readable storage medium of claim 13, wherein the identifying the object depicted by the image based on the plurality of image features further comprises:
  detecting the plurality of image features; and
  presenting an indicator at a position within the image in response to the detecting the plurality of image features.

* * * * *